United States Patent [19]

Shore et al.

[11] Patent Number: 5,053,365

[45] Date of Patent: Oct. 1, 1991

[54] METHOD FOR THE LOW TEMPERATURE PREPARATION OF AMORPHOUS BORON NITRIDE USING ALKALI METAL AND HALOBORAZINES

[75] Inventors: Sheldon G. Shore, Columbus, Ohio; Shawn E. Dolan, Sterling Heights, Mich.

[73] Assignee: The Ohio State University Research Foundation, Columbus, Ohio

[21] Appl. No.: 487,020

[22] Filed: Feb. 28, 1990

[51] Int. Cl.$^5$ .................... C04B 35/02; C04B 35/58; C01B 35/14; C01B 35/06

[52] U.S. Cl. .................................. 501/96; 501/94; 423/276; 423/284; 423/289; 423/290; 423/292

[58] Field of Search .............. 501/92, 96, 94; 502/202; 423/276, 284, 289, 290, 292

[56] References Cited

U.S. PATENT DOCUMENTS

| | | | |
|---|---|---|---|
| 3,241,919 | 4/1966 | O'Conner | 23/191 |
| 4,349,517 | 9/1982 | Lysanov et al. | 423/290 |
| 4,551,316 | 11/1985 | Iizuka | 423/290 |
| 4,562,050 | 12/1985 | Koeda et al. | 423/290 |
| 4,707,556 | 7/1987 | Paciarek et al. | 556/403 |
| 4,853,196 | 8/1989 | Koshida et al. | 423/290 |
| 4,900,526 | 2/1990 | Matsuda et al. | 423/290 |

FOREIGN PATENT DOCUMENTS

| | | | |
|---|---|---|---|
| 0489871 | 12/1975 | Australia | 423/290 |
| 0675630 | 12/1963 | Canada | 423/290 |
| 0754992 | 3/1967 | Canada | 423/290 |
| 1513791 | 3/1967 | France | 423/290 |
| 8606057 | 10/1986 | PCT Int'l Appl. | 423/290 |
| 0475163 | 7/1969 | Switzerland | 423/290 |

OTHER PUBLICATIONS

Mazurenko, *Sin. Almazy.*, 3, 3 (1979).
Meller, A., Gmelin Handbook der Anorganische Chemie Boron Compounds 3rd Suppl., 3, pp. 1–93, (1988).
Meller, A., Gmelin Handbook der Anorganische Chemie Boron Compounds 2nd Suppl., 1, 304 et seq., (1983).
Saito, Proc. Intern. Symp. Factors Densif. Sintering Oxide non–oxide Ceram., Hakone, Japan (1979).
Singh, Proc. Electrochem. Soc., pp. 87–88, vol. 543 (1987).
Bradford et al., Inorg. Chem., 1, 99 (1962).

*Primary Examiner*—William R. Dixon, Jr.
*Assistant Examiner*—Michael Marcheschi
*Attorney, Agent, or Firm*—Frank T. Kremblas

[57] ABSTRACT

The invention relates to an energy efficient method for the production of boron nitride materials at temperatures of from about 100 degrees to about 230 degrees Centigrade. The boron nitride materials produced by the present invention are carbon-free and are prepared by combining at reduced pressure an alkali metal, such as potassium, rubidium, cesium, or mixtures thereof, or a potassium/sodium mixture, with a boron-, nitrogen-, and halogen-containing material, such as a haloborazine, haloborazane, or haloaminoborane. The preferred boron-, nitrogen-, and halogen-containing materials are trihalogenated, the preferred halogen is chlorine, and the preferred alkali metal is cesium.

30 Claims, No Drawings

METHOD FOR THE LOW TEMPERATURE PREPARATION OF AMORPHOUS BORON NITRIDE USING ALKALI METAL AND HALOBORAZINES

This invention was made with government support under Grant No. DAAL03-88-K-0176 awarded by the U.S. Army. The government has certain rights in the invention.

BACKGROUND

Boron nitride (BN) can exist in an amorphous mode or a crystalline mode. Crystalline BN can exist in three forms; hexagonal, cubic, and wurtzite modification. The hexagonal form is similar in structure to graphite, consisting of a simple sheet structure composed of fused borazine rings. This form of BN is colorless when pure and sublimes at about 3000° Centigrade. It is chemically inert except to extremely hot alkali and fluorine.

The second allotrope of BN is the cubic form which is analogous to diamond in its properties, structure (sphalerite), and preparation. If properly synthesized, the cubic form of BN is hard enough to scratch diamond.

The third form of crystalline BN is the wurtzite modification, which is not as hard as cubic but harder than the hexagonal form.

The cubic form is prepared by subjecting the hexagonal form to high pressure (for example, 85,000 atmospheres) and heat (1800° Centigrade). See, for example, Mazurenko, Sin. Almazy. 3, 3 (1979). Alkali metal or alkaline earth metals are known to catalyze this transformation at lower pressures and temperatures. See Meller, Gmelin Handbook der Anorganische Chemie Boron Compounds, 2nd Suppl., 1, 304 (1983).

The wurtzite modification is conveniently made by shock wave-induced transformation of the hexagonal material, as taught by Saito, Proc. Intern. Symp. Factors Densif. Sintering Oxide non-oxide Ceram., Hakone, Japan (1979).

Many preparations have been utilized in the past for the production of hexagonal and amorphous BN. Most of these methods have involved the use of borates, boric acid, and cheap nitrogen-containing compounds, such as urea and ammonia. These methods have included, for example, high temperature heating of $BCl_3$ and $NH_3$ or urea in the vapor phase. The temperatures generally must be high enough to cause the simultaneous breakdown of by-product ammonium chloride to nitrogen, hydrogen, and hydrogen chloride.

One method has been to react boron trichloride with molten aluminum in the presence of nitrogen gas.

Yet another method for the production of BN has been the reduction of alkali cyanides.

High purity BN can also be made by the chemical vapor deposition (CVD) of $BCl_3$ or $B_2H_6$ and $NH_3$ or by CVD of borazine and its derivatives at 900° to 1500° Centigrade. See Meller, supra, and Singh, Proc. Elec-trochem. Soc., pages 87-88, vol. 543 (1987).

U.S. Pat. No. 3,241,919, issued Mar. 22, 1966 to O'-Conner, teaches the preparation of BN material showing a complete lack of three-dimensional order among the lamellae. These BN materials are described therein as "turbostratic" in nature. The method utilizes cyrstalline urea, orthoboric acid, and nitrogen gas, and eventually reaches a temperature of 800° to 2000° Centigrade.

U.S. Pat. No. 4,707,556, issued Nov. 17, 1987 to Paciarek et al., teaches the preparation of polymeric alkyl boron nitrides by a process comprising reacting chloroborazines with a disilazane.

Bradford et al., Inorg. Chem., 1, 99 (1962), has shown the reaction of N-lithioborazines or organo-haloborazines to prepare BN polymeric material.

However, the processes previously used to make or purify BN have required high temperatures of 900° to 2800° Centigrade or higher and tedious processing steps to achieve a BN product of high purity. Furthermore, often in chemically removing foreign matter such as by-products or unreacted starting materials, the BN undergoes reversion to $H_3BO_3$.

There is thus a need for a low temperature method for the preparation of high purity BN without tedious processing steps.

SUMMARY OF THE INVENTION

The present invention relates to a novel method to produce boron nitride of high purity without the conventional use of high temperatures. The energy efficient method claimed herein for producing BN comprises reacting an alkali metal or alkali metal alloy with a haloborazine, haloborazane, or haloaminoborane at reduced pressure and at a temperature of less than about 230 degrees Centigrade.

The general reaction equation of this method is shown below:

$$(BXNH)_3 + 3\,M \rightarrow 3\,BN + HX + 3\,MX + H_2$$

where M = Na/K mixture, K, Rb, Cs, or mixtures thereof and X = F, Cl, Br, or I.

In general, the inventors believe but do not wish to be limited to the theory that the alkali metal will combine with the haloborazine, haloborazane, or haloaminoborane by abstracting a halogen atom from the boron atom, thereby making the boron atom a very reactive positively charged site. It is believed that when the electron density around the boron atom has been reduced, it becomes more electrophilic and will react with other halogenated boron atoms. Thus the alkali metal has a reaction initiating effect in the reaction and surprisingly need not be present in stoichiometric amounts, as evidenced by the large amounts of hydrogen halide being given off. Thus even relatively low levels of the alkali metal are effective at initiating the desired low temperature, rapid conversion to BN. The mole ratio of alkali metal to boron-, nitrogen-, and halogen-containing compound can therefore range widely depending on the reactivity of the alkali metal, the reactivity of the nitrogen-, boron-, and halogen-containing compound, the temperature of the reactor, and the pressure within the reactor. A preferred mole ratio of alkali metal to nitrogen-, boron-, and halogen-containing compound is from about 1 to 100 to about 5 to 1, respectively.

The novel low temperature method claimed herein for rapidly producing amorphous BN has many useful applications including, but not limited to, those provided in Meller, supra, pages 31-81, which uses are incorporated herein by reference. These useful applications also include, for example and not by limitation, the production of electronic components, and for conversion to the cubic form of BN for use in cutting tools and electronic heat sinks. The materials produced by the present invention are particularly useful in applications requiring that little or no carbon be present in the BN material.

DETAILED DESCRIPTION OF THE INVENTION

It has been discovered in accordance with this invention that boron nitride of high purity can be manufactured efficiently and at relatively low cost by reacting certain Group 1A alkali metals, or metal alloys thereof, at relatively low temperatures (about 100° to about 230° Centigrade) with a nitrogen-, boron-, and halogen-containing compound such as mono-, di-, or trihaloborazines, or haloborazanes, or haloaminoboranes.

The borazine molecule has the general structure shown below:

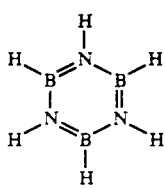

B-trichloroborazine has the general structure shown below in which the chlorine atoms are each bonded to a boron atom:

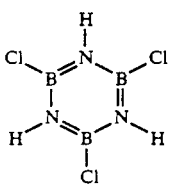

B-trichloroborazan, a saturated molecule, has the general structure shown below in which the chlorine atoms are each bonded to a boron atom:

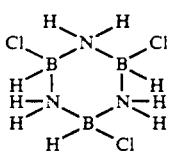

B-tribromoborazines, B-trifluoroborazines, and B-triiodoborazines, as well as the B-tribromoborazanes, B-trifluoroborazanes, and B-triiodoborazanes have general structures analogous to those shown above except for the substitution of bromine, fluorine, or iodine for the chlorine atoms. The mono- and di-halo compounds are not well known, but if produced, would be expected to undergo the same reaction chemistry as the trihalocompounds.

The aminohaloboranes operative herein as the nitrogen-, boron-, and halogen-containing compound can include, for example, $NH_3BCl_3$, $NH_3BHCl_2$, and $NH_3BH_2Cl$, and the bromo- or fluoro- or iodo- analogs thereof.

In a preferred embodiment of the present invention, cesium metal is combined with B-trichloroborazine ($B_3N_3Cl_3H_3$) in a vessel, such as for example, a glass bomb. The vessel is evacuated to eliminate, or substantially eliminate, oxygen and nitrogen which might cause unwanted side reactions, and the vessel then is placed in an oil bath, sand bath, hot air, or otherwise heated to a temperature of 100 to 230 degrees C., preferably, for example, to about 125° Centigrade. The temperature should be sufficient to cause the alkali metal to melt. After approximately five minutes a brilliant flash is observed and white amorphous boron nitride powder is produced.

The temperatures needed to produce the rapid reaction of the present invention will vary depending on the reactivity of the reactants and the reactor pressure. However, in general and not by limitation, Cs will generally initiate the conversion of the nitrogen-, boron-, and halogen-containing compound to BN at about 100-130 degrees Centigrade; Rb at about 150 degrees Centigrade; and K at about 200-215 degrees Centigrade. Na is not effective at readily attainable pressures and temperatures.

The reaction time necessary for the method of the present invention will vary depending upon several factors including the reactivity and/or volatility of the components and the pressure within the reactor. However, the reaction times of this invention in general are surprisingly on the order of several seconds to several minutes, unlike the conventional reaction times of several hours for the production of BN.

The by-products produced by the reaction include alkaline metal halides, such as cesium chloride, hydrogen halide, and hydrogen gas, which are easily removed either by washing out the halide salts with water or volatilizing the salts out, and pumping out the gases. Thus it is not essential to wash salts out with water which might introduce oxygen; instead one can volatilize or sublime out the halide salt.

X-ray powder diffraction of the BN thus produced showed that the material was essentially amorphous, although a very broad hump of low intensity was centered in the approximate location of the 002 plane (about 26 degrees).

The amorphous BN produced by the method of the present invention can be transformed to partly polycrystalline material, probably hexagonal BN, by heating in a sealed evacuated quartz tube for 24 hours or less at 1100° Centigrade.

By the present invention, use of the fluorinated nitrogen-, boron-, and halogen-containing compounds as discussed above will provide fluoride salt by-products which are known to catalyze the thermal conversion of BN to crystalline form. SEM of the BN produced above revealed the presence of cyrstallites along with some amorphous material. EELS revealed a boron to nitrogen ratio of 1.00 to 1.065, respectively.

One advantage of the method of the present invention is that the BN produced is carbon-free since carbon-containing compounds are not utilized as starting materials. Carbon is undesirable in most boron nitride articles because of the tendency of the carbon to oxidize much more readily than does the boron or the nitrogen. Oxidation of any carbon present leads to destructive failure of articles made from the BN material.

Another advantage of the method of the present invention is that the reaction by-product, alkaline halide, can be washed away with water or sublimed away at the appropriate temperature to thereby provide high purity BN.

Yet another advantage of the method of the present invention is the control of the ratio of B to N by using borazines, borazanes, or aminoboranes. Unlike conventional techniques such as CVD, where formation of B—N bonds and the ratio of B to N is not well controlled, the present invention insures that the ratio of B to N remains constant.

Still another, and probably most significant, advantage of the method of the present invention is the relatively low reaction temperatures, about 100 to about 230 degrees Centigrade, and reduced pressures used herein compared to the conventional conditions for the preparation of boron nitride. The prior art methods of producing BN materials require extremely high temperatures and relatively long reaction times. Because of the presence of alkali metals in the method of the present invention, the reaction conditions are extremely energy efficient in terms of low reaction temperatures and short reaction times. Additionally, the useful range of reduced pressures herein extends from the very low pressures attainable by high vacuum systems to pressures just below one atmosphere. No lower pressure limit is known. Thus, for example, the reduced pressure is in the range of from about $0.1 \times 10^{-5}$ Torr to about one atmosphere. It is preferred to use pressures of $0.1 \times 10^{-1}$ Torr or less so as to achieve volatilization at more convenient temperatures, and the further the pressure is reduced in the reactor, the lower the temperature will be at which the desired reaction takes place. The reduction in pressure in the reactor in the method of the present invention is also useful to help minimize or eliminate the formation of metal oxides, and prevent formation of impure BN which contains oxygen dopant, or other unwanted byproducts.

It is believed that a blanket of inert gas, such as argon, could also be used in the method disclosed herein but preferably at a pressure less than one atmosphere.

The residual chlorine content in the BN produced by the present invention when using B-trichloroborazine is very low, being 1 to 2 per cent or less by weight. The absence of the B-Cl stretch in the infrared spectrum (about 1100 cm$^{-1}$) also indicates that the product is essentially free from chlorine contamination.

It has been noted in the present invention that coatings produced on the molten alkali metals in the reactions of trihaloborazine with potassium or rubidium appear to have protected the alkali metals from further reaction with the haloborazine. Thus, in a preferred embodiment of the method of the present invention, it is desirable, but not required, to continuously shake, stir, or otherwise agitate the reaction vessel or its contents to promote continued and more complete reaction by continuously exposing molten metal to the haloborazine.

In another embodiment of the present invention, the alkali metal is very finely divided to provide high surface area for exposure to and reaction with the nitrogen-, boron-, and halogen-containing compound. Finely dividing the alkali metal also improves the volatilization of the metal which reduces the time and temperature requirements for the production of BN.

It has been observed in the method of the present invention that the reaction of the haloborazines with Rb and K occurs at higher temperatures than the reaction of the haloborazines with Cs. It is believed, but the inventors do not wish to be limited to the theory that, the temperatures required for the reaction with the haloborazines is associated at least partially with the metal's electropositive character. It is believed that the more electropositive the metal is, the more easily the initial abstraction of a halogen substituent can occur; i.e., the activation energy of the reaction is lower. In fact, the attempted reactions of sodium metal with (BClNH)$_3$ or (BBrNH)$_3$, which reactions did not produce BN at reaction temperatures up to 380 degrees Centigrade, illustrate that only the more electropositive alkali metals are operative in the present invention.

However, it should be noted that Na/K mixture is operative in the method of the present invention to react with, for example, haloborazines to produce, at relatively higher reaction temperatures, the desired BN product. Thus in the present invention, when using the Na/K mixture a reaction temperature of 275 to 300 degrees Centigrade is usually required. When using the Na/K mixture, the preferred ratio of Na to K in the mixture is from about 1 to 4 to about 5 to 1, but this range is not a limit herein and can extend up to 1 to 99 (Na to K). A particularly preferred mixture is K$_2$Na, having a 1:2 atom ratio of Na:K. Other mixtures of the alkali metals, such as Na/Cs, K/Cs, K/Rb, and ternary mixtures such as Na/K/Cs, and K/Rb/Cs and the like are also operative herein.

It is further believed that the reaction temperatures necessary in the method of the present invention are also dependent on the vapor pressures of the reactants. Thus the higher atomic weight alkali metals, having greater vapor pressures at a given temperature and pressure, will react more readily than the lower atomic weight alkali metals. Thus Cs will react at a lower temperature than will Rb, and Rb in turn will react with the nitrogen-, boron-, and halogen-containing material at lower temperatures than will K or the Na/K mixture at a given pressure.

Similarly, the halogens of the haloborazines, haloborazanes, and haloaminoboranes will contribute to the reactivity of the nitrogen-, boron-, and halogen-containing material useful in the method of the present invention. The bromo- and iodo- compounds are not well known, but if produced, would be expected to undergo the same reaction chemistry as the chlorocompounds, and in fact, be more reactive than the chloro-compounds. The fluoro-compounds would be expected to be less reactive than the chlorocompounds, thus requiring higher temperatures because of the strength of the B—F bond. However, chlorine has been the preferred halogen because of ease of use and low cost.

The method of the present invention is performed in the absence of a solvent. It is preferred that the alkali metals be vaporous or molten, since solid metals are extremely slow to react.

According to the method of the present invention, it is also believed that BN can be produced in a batchwise or semi-continuous process wherein the alkali metal and the nitrogen-, boron-, and halogen-containing material are fed into the reactor at the proper temperatures and reduced pressures, and the by-products are removed and the BN purified by water washing and/or sublimation. Thus in one embodiment of the present invention, a process is provided by simultaneously introducing into the reactor the nitrogen-, boron-, and halogen-containing material and the alkali metal. Either reactant may be preheated and sprayed into a reduced pressure reactor or can be sprayed into the reduced pressure reactor and heated therein. In such a method, it would be preferred to vaporize the alkali metal before introduction into the reduced pressure reactor.

It is believed that alkaline earth metals, Group IIA, would also be operative in the present invention instead of the Group IA alkali metals. However, the alkaline earth metals are not as volatile as the alkali metals and as such would not as readily undergo the reaction with the nitrogen-, boron-, and halogen-containing material at the same temperatures and reduced pressures.

The following examples are provided for illustrative purposes only and are not representations of limitations of the present invention. Substitution of other alkali metals or other haloborazines, haloborazanes, or haloaminoboranes as taught above will be readily recognized by those skilled in the art as within the scope of the invention.

Preparation of BN from $(BClNH)_3$ and Cesium

In a dry box containing no more than 5 to 10 parts per million of oxygen gas, 1.08 grams (8.12 mmol) of cesium metal from Strem Chemical and 1.83 gram (10.0 mmol) of B-trichloroborazine from Strem Chemical were placed into a glass bomb of 160 mL volume. The bomb was evacuated and then placed into a stirred oil bath of 125 degrees Centigrade. The pumping station used herein for the evacuation consisted of a Welch Duo-Seal mechanical vane rotary pump and a two stage mercury diffusion pump. The rotary pump pumped the system to a pressure of approximately $10^{-3}$ Torr at which time the mercury diffusion pump was turned on to reach an ultimate vacuum of $10^{-4}$ to $10^{-5}$ Torr. After approximately five minutes, a brilliant flash lasting a few seconds was observed with the production of a white powder consisting of BN and CsCl. Evolved gas measurements indicated 4 to 6 mmols of HCl were produced, and 7 to 10 mmols of hydrogen gas were produced. The boron nitride was separated from the CsCl by filtration with water, and adsorbed water was removed by dynamic vacuum. In addition, 0.41 g of starting material was recovered by sublimation. The yield based on the starting material consumed was 55% to 60%.

Preparation of BN from $(BClNH)_3$ and Rubidium

In the dry box, a glass bomb of 160 mL volume was charged with 0.471 grams (5.50 mmol) of rubidium and 1.10 grams (6.00 mmol) of $(BClNH)_3$. Using a stirred oil bath, the mixture was heated to 180 degrees Centigrade for 20 minutes. A surface coating of a purple material was observed. The temperature was reduced to 160 degrees Centigrade for several minutes, and the reaction vessel was taken out of the oil bath and immediately stirred by hand with a magnet. After 5 to 10 seconds of stirring, a flash was observed, and BN and RbCl was produced. The yield after water washing was 48%.

Preparation of BN from $(BBrNH)_3$ and Potassium

In the dry box, a glass bomb of 160 mL volume was charged with 1.586 grams (5.00 mmol) of $(BBrNH)_3$ and 0.3909 grams (lo.00 mmol) of potassium. The mixture was heated in a sand bath at 210 to 230 degrees Centigrade. The $(BBrNH)_3$ was refluxed for about 10 minutes during which time a black-purple coating formed over the liquid metal. The reaction vessel was then removed from the sand bath and immediately shaken exposing fresh metal liquid and vapor to the $(BBrNH)_3$. At this time, a flash of orange-red light was observed, and BN and KBr were produced. The yield of BN based on starting material used was 51%.

That which is claimed is:

1. A method for preparing carbon-free boron nitride comprising the steps: combining substantially in the absence of oxygen and at reduced vapor pressure, an alkali metal selected from the group consisting of potassium, rubidium, cesium, and mixtures thereof with a boron-, nitrogen-, and halogen-containing compound to form a mixture, wherein the alkali metal and the boron-, nitrogen-, and halogen-containing compound are present in the mixture in a mole ratio of from about 1 to 100 to about 5 to 1, respectively, and heating the mixture to a temperature above about 100 degrees Centigrade and below about 230 degrees Centigrade.

2. The method of claim 1 wherein the boron-, nitrogen-, and halogen-containing compound is selected from the group consisting of trihaloborazines, dihaloborazines, monohaloborazines, trihaloborazanes, dihaloborazines, monohaloborazines, trihaloaminoborane, dihaloaminoborane, and monohaloaminoborane.

3. The method of claim 1 wherein the alkali metal and the boron-, and nitrogen-, and halogen-containing compound are combined in a vessel at a pressure in the range of from about $0.1 \times 10^{-5}$ Torr to about one atmosphere.

4. The method of claim 1 further comprising the step of removing alkali metal halide by-products by water washing of the boron nitride produced.

5. The method of claim 1 further comprising the step of removing from the boron nitride any alkali metal halide by-products by sublimation of said alkali metal halide.

6. The method of claim 1 wherein the alkali metal is preheated and vaporized before being combined with the boron-, nitrogen-, and halogen-containing compound.

7. The method of claim 1 wherein the boron-, nitrogen-, and halogen-containing compound is preheated and vaporized before being combined with the alkali metal.

8. The method of claim 1 wherein the boron-, nitrogen-, and halogen-containing compound and the alkali metal are both preheated and vaporized before being combined.

9. The method of claim 1 wherein the boron-, nitrogen-, and halogen-containing compound is B-trichloroborazine, the alkali metal is cesium, the B-trichloroborazine and the cesium are combined in a vessel at a reduced pressure of less than about $0.1 \times 10^{-1}$ Torr, and wherein the mixture is then heated to a temperature of above about 100 degrees Centigrade.

10. The method of claim 1 wherein the boron-, nitrogen-, and halogen-containing compound is B-trichloroborazine, the alkali metal is rubidium, the B-trichloroborazine and the rubidium are combined in a vessel at a reduced pressure of less than about $0.1 \times 10^{-1}$ Torr, and wherein the mixture is then heated to a temperature of above about 180 degrees Centigrade.

11. The method of claim 1 wherein the boron-, nitrogen-, and halogen-containing compound is B-trichloroborazine, the alkali metal is potassium, the B-trichloroborazine and the potassium are combined in a vessel at a reduced pressure of less than about $0.1 \times 10^{-1}$ Torr, and wherein the mixture is then heated to a temperature of above about 220 degrees Centigrade.

12. The method of claim 1 wherein the boron-, nitrogen-, and halogen-containing compound is B-tribromoborazine, the alkali metal is cesium, the B-tribromoborazine and the cesium are combined in a vessel at a reduced pressure of less than about $0.1 \times 10^{-1}$ Torr, and wherein the mixture is then heated to a temperature between about 100 and 120 degrees Centigrade.

13. The method of claim 1 wherein the boron-, nitrogen-, and halogen-containing compound is B-tribromoborazine, the alkali metal is rubidium, the B-tribromoborazine and the rubidium are combined in a vessel at a reduced pressure of less than about $0.1 \times 10^{-1}$ Torr, and wherein the mixture is then heated to a temperature between about 130 and 150 degrees Centigrade.

14. The method of claim 1 wherein the boron-, nitrogen-, and halogen-containing compound is B-tribromoborazine, the alkali metal is potassium, the B-tribromoborazine and the potassium are combined in a vessel at a reduced pressure of less than about $0.1 \times 10^{-1}$ Torr, and wherein the mixture is then heated to a temperature between about 210 and 230 degrees Centigrade.

15. The method of claim 1 wherein the boron-, nitrogen-, and halogen-containing compound is B-trifluoroborazine, the alkali metal is cesium, the B-trifluoroborazine and the cesium are combined in a vessel at a reduced pressure of about $0.1 \times 10^{-1}$ Torr, and wherein the mixture is then heated to a temperature between about 100 and 140 degrees Centigrade.

16. The method of claim 1 wherein the boron-, nitrogen-, and halogen-containing compound is B-trifluoroborazine, the alkali metal is rubidium, the B-trifluoroborazine and the rubidium are combined in a vessel at a reduced pressure of less than about $0.1 \times 10^{-1}$ Torr, and wherein the mixture is then heated to a temperature between about 100 and 150 degrees Centigrade.

17. The method of claim 1 wherein the boron-, nitrogen-, and halogen-containing compound is B-trifluoroborazine, the alkali metal is potassium, the B-trifluoroborazine and the potassium are combined in a vessel at a reduced pressure of less than about $0.1 \times 10^{-1}$ Torr, and wherein the mixture is then heated to a temperature between about 100 and 200 degrees Centigrade.

18. The method of claim 1 wherein the boron-, nitrogen-, and halogen-containing compound is B-trichloroborazane, the alkali metal is cesium, the B-trichloroborazane and the cesium are combined in a vessel at a reduced pressure of less than about $0.1 \times 10^{-1}$ Torr, and wherein the mixture is then heated to a temperature above 125 degrees Centigrade.

19. The method of claim 1 wherein the boron-, nitrogen-, and halogen-containing compound is B-trichloroborazane, the alkali metal is rubidium, the B-trichloroborazane and the rubidium are combined in a vessel at a reduced pressure of less than about $0.1 \times 10^{-1}$ Torr, and wherein the mixture is then heated to a temperature above about 160 degrees Centigrade.

20. The method of claim 1 wherein the boron-, nitrogen-, and halogen-containing compound is B-trichloroborazane, the alkali metal is potassium, the B-trichloroborazane and the potassium are combined in a vessel at a reduced pressure of less than about $0.1 \times 10^{-1}$ Torr, and wherein the mixture is then heated to a temperature above about 180 degrees Centigrade.

21. The method of claim 1 wherein the boron-, nitrogen-, and halogen-containing compound is B-tribromoborazane, the alkali metal is cesium, the B-tribromoborazane and the cesium are combined in a vessel at a reduced pressure of less than about $0.1 \times 10^{-1}$ Torr, and wherein the mixture is then heated to a temperature between about 100 and 230 degrees Centigrade.

22. The method of claim 1 wherein the boron-, nitrogen-, and halogen-containing compound is B-tribromoborazane, the alkali metal is rubidium, the B-tribromoborazane and the rubidium are combined in a vessel at a reduced pressure of less than about $0.1 \times 10^{-1}$ Torr, and wherein the mixture is then heated to a temperature between about 100 and 230 degrees Centigrade.

23. The method of claim 1 wherein the boron-, nitrogen-, and halogen-containing compound is B-tribromoborazane, the alkali metal is potassium, the B-tribromoborazane and the potassium are combined in a vessel at a reduced pressure of less than about $0.1 \times 10^{-1}$ Torr, and wherein the mixture is then heated to a temperature between about 100 and 230 degrees Centigrade.

24. The method of claim 1 wherein the boron-, nitrogen-, and halogen-containing compound is B-trifluoroborazane, the alkali metal is cesium, the B-trifluoroborazane and the cesium are combined in a vessel at a reduced pressure of less than about $0.1 \times 10^{-1}$ Torr, and wherein the mixture is then heated to a temperature between about 100 and 230 degrees Centigrade.

25. The method of claim 1 wherein the boron-, nitrogen-, and halogen-containing compound is B-trifluoroborazane, the alkali metal is rubidium, the B-trifluoroborazane and the rubidium are combined in a vessel at a reduced pressure of less than about $0.1 \times 10^{-1}$ Torr, and wherein the mixture is then heated to a temperature between about 100 and 230 degrees Centigrade.

26. The method of claim 1 wherein the boron-, nitrogen-, and halogen-containing compound is B-trifluoroborazane, the alkali metal is potassium, the B-trifluoroborazane and the potassium are combined in a vessel at a reduced pressure of less than about $0.1 \times 10^{-1}$ Torr, and wherein the mixture is then heated to a temperature between about 100 and 230 degrees Centigrade.

27. The method of claim 1 wherein the boron-, nitrogen-, and halogen-containing compound is an aminohaloborane selected from the group consisting of $NH_3BCl_3$, $NH_3BHCl_2$, $NH_3BH_2Cl$, $NH_3BF_3$, $NH_3BHF_2$, $NH_3BH_2F$, $NH_3BBr_3$, $NH_3BHBr_2$, $NH_3BH_2Br$, $NH_3BI_3$, $NH_3BHI_2$, and $NH_3BH_2I$.

28. A method for preparing carbon-free boron nitride comprising the steps: combining substantially in the absence of oxygen and at reduced pressure, a composition of sodium and potassium, wherein the atom ratio of sodium to potassium is from about 1 to 4 to about 1 to about 99, with a boron-, nitrogen-, and halogen-containing compound to form a mixture, wherein the potassium-sodium composition and the boron-, nitrogen-, and halogen-containing compound are present in the mixture in a mole ratio of from about 1 to 100 to about 5 to 1, respectively, and heating the mixture to a temperature between 275 and about 300 degrees Centigrade.

29. The method of claim 28 wherein the boron-, nitrogen-, and halogen-containing compound is selected from the group consisting of trihaloborazines, dihaloborazines, monohaloborazines, trihaloborazanes, dihaloborazines, monohaloborazines, trihaloaminoborane, dihaloaminoborane, and monohaloaminoborane.

30. The method of claim 28 wherein the mixture of sodium and potassium has the general composition $K_2Na$.

* * * * *

UNITED STATES PATENT AND TRADEMARK OFFICE
CERTIFICATE OF CORRECTION

PATENT NO. : 5,053,365
DATED      : October 1, 1991
INVENTOR(S): Sheldon G. Shore and Shawn E. Dolan It is certified that error appears in the above-identified patent and that said Letters Patent is hereby corrected as shown below:

In claim 1, column 7, line 67, for "reduced vapor pressure" read --reduced pressure--. In claim 2, column 8, line 13, for "dihaloborazines" read --dihaloborazanes-- and for "monohaloborazines" read --monohaloborazanes--. In claim 29, column 10, line 62, for "dihaloborazines" read --dihaloborazanes-- and for "monohaloborazines" read --monohaloborazanes--.

Signed and Sealed this

Ninth Day of February, 1993

Attest:

STEPHEN G. KUNIN

Attesting Officer

Acting Commissioner of Patents and Trademarks